HIGH FREQUENCY ELECTRONIC DEVICE

Filed Nov. 5, 1946 3 Sheets-Sheet 1

INVENTOR
J. R. PIERCE
BY
E. V. Griggs
ATTORNEY

Oct. 23, 1956 J. R. PIERCE 2,768,328

HIGH FREQUENCY ELECTRONIC DEVICE

Filed Nov. 5, 1946 3 Sheets-Sheet 2

INVENTOR
J. R. PIERCE
BY E. V. Griggs
ATTORNEY

HIGH FREQUENCY ELECTRONIC DEVICE

Filed Nov. 5, 1946 3 Sheets-Sheet 3

INVENTOR
J. R. PIERCE
BY E. V. Griggs
ATTORNEY 2,768,328

HIGH FREQUENCY ELECTRONIC DEVICE

John R. Pierce, Millburn, N. J., assignor to Bell Telephone Laboratories, Incorporated, New York, N. Y., a corporation of New York Application November 5, 1946, Serial No. 707,812

40 Claims. (Cl. 315—39.3)

This invention relates to devices for the amplification of high frequency electrical waves, particularly such devices incorporating a relatively long portion of wave transmission path along which interaction between electrons and the high frequency electric field is utilized to produce amplification of the transmitted wave.

An object of the invention is to provide devices capable of producing considerable amplification at high frequencies over a wide band of such frequencies.

Another object is to provide electronic amplifying devices which may be inserted into a high frequency transmission circuit to produce, when energized, amplification over a wide band of frequencies and which though deenergized and without electron flow do not break the continuity of the circuit.

Another object is to provide in such a device uniformity of interaction between the electrons and the high frequency field throughout the entire length of the region of interaction.

In the operation of electronic amplifiers at very high frequencies many difficulties have been encountered. Circuit losses, impedance variations and other factors have hindered the attainment of high amplification and expedients, helpful in one direction, have sometimes imposed limitations in other directions to the detriment of desired overall performance. As an example the use of low loss resonant circuits while contributing to the maintenance of driving voltages and the production of amplification causes the apparatus to be effective over a relatively narrow band of frequencies.

To overcome this limitation and obtain other operating advantages, the amplifiers of the present invention utilize transmission line circuits and include a considerable length of such line along which electronic interaction with a high frequency field takes place to reinforce and amplify a high frequency wave being transmitted. An important feature of some embodiments of the invention is the use of elongated cathode extending along the length of the line over which electronic interaction takes place. Other embodiments utilize a shorter cathode or an electron gun at the input end of the interaction space. A transverse unidirectional magnetic field is employed to appropriately direct the paths of the electrons leaving the cathode. With the cathode extending the length of the interaction space uniformity of interaction along that entire length is enhanced.

The invention is explained in more detail in the following description and the accompanying drawings in which.

Figure 1:
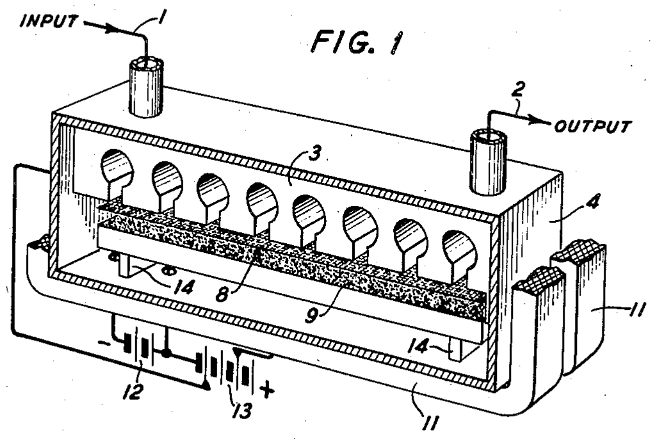
Figs. 1 and 2 illustrate an embodiment of the invention in which the length of transmission line included in the amplifier comprises a series of coupled cavity resonators.
Figure 2:
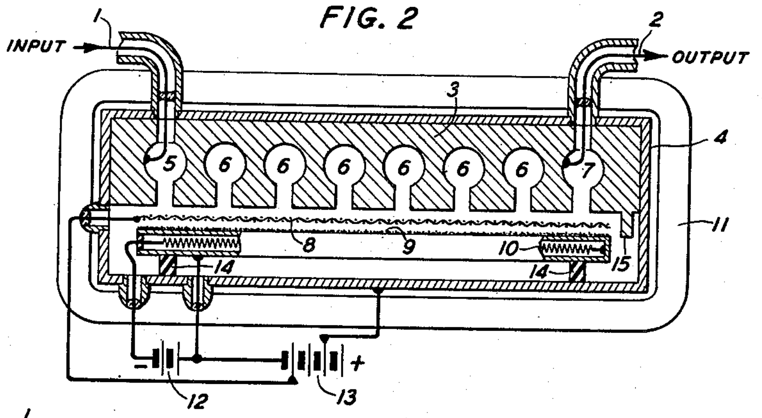

Figs. 1 and 2 illustrate one embodiment, Fig. 1 being a perspective view, with a section through the evacuated envelope to show the interior and Fig. 2 being a central longitudinal section. The evacuated envelope 4 of electrically conducting material encloses an elecrton emitting cathode the emissive coating of which is indicated at 9 which is indirectly heated by heater 10 and supported on insulators 14, a control grid 8 which may or may not be used and a series of coupled cavity resonators 5, 6 and 7. These resonators may be constructed in any suitable manner. In this illustration they are shown for an example as being cut out of a solid block 3 of conducting material, such as copper. They may be arranged in a straight line as shown or otherwise. An opening from each cavity resonator faces the cathode in such proximity to it that electrons emitted from the cathode may interact with the electric fields of the cavities at the openings. A high frequency input may be coupled to the cavity 5 by means of the input coaxial conductor 1, as shown, and an output load may be coupled to the cavity 7 by means of the output coaxial conductor 2. The cavities 6 located between the input cavity 5 and the output cavity 7 may vary in number as desired. On account of the intercavity couplings by way of the openings facing the cathode 9 high frequency energy may be transmitted through the transmission circuit comprising all of the cavities from the input 1 to the output 2. This transmission circuit is designed so that the velocity of wave transmission therethrough and of the associated electric field traveling in the interaction space between the block 3 and the cathode 9 is reduced to be comparable to the velocity of the electrons traveling in the same general direction and interacting with the field. Other means of intercavity coupling than that provided by the openings facing the cathode may be employed to replace those couplings or to supplement them to alter the transmission characteristic of the circuit. This circuit comprising the cavity resonators is essentially a band-pass filter linking input to output, the band of which may be controlled by the couplings between the resonators. The potential source 12 is employed to energize the cathode heater 10 and source 13 is used to bias the block 3 (which serves as anode) positively with respect to the cathode 9 and also to bias the grid 8 which may be used to control the space current of the device as well as to keep the radio frequency field away from the immediate vicinity of the cathode and avoid losses which may be occasioned thereby. This grid, however, is not essential and may be omitted. The solenoid coils 11 are to provide a unidirectional magnetic field perpendicular to the electrical field between the anode 3 and the cathode 9 due to the biasing voltage of the anode and perpendicular also to the length of the device and the travel of the high frequency wave from the input to the output. This magnetic field deflects electrons coming from the cathode into the direction of travel of the high frequency wave from the input to the output. The magnetic field may be produced in any suitable manner such as by the coils illustrated, by an electromagnet as illustrated in Figs. 3, 4, 5 and 6, or by a permanent magnet.

An integral downward projection 15 on the block 3 near the right-hand end of the grid 8 may be seen in Fig. 2. The purpose of this is to collect electrons directed to the right at that point and which would otherwise strike the envelope 4.

As has been mentioned the magnetic field perpendicular to the electric field in the space between the cathode and the face of block 3 in which are the openings to the cavity resonators bends the electron motion in the direction of travel of the wave to be amplified. A continuous interchange of energy between the electrons and the high frequency wave field is provided; electrons which lose energy to the high frequency field move toward the resonator block faces and gain energy from the direct current source 13 thus preserving their velocity in the direction of travel of the wave.

Figure 3:
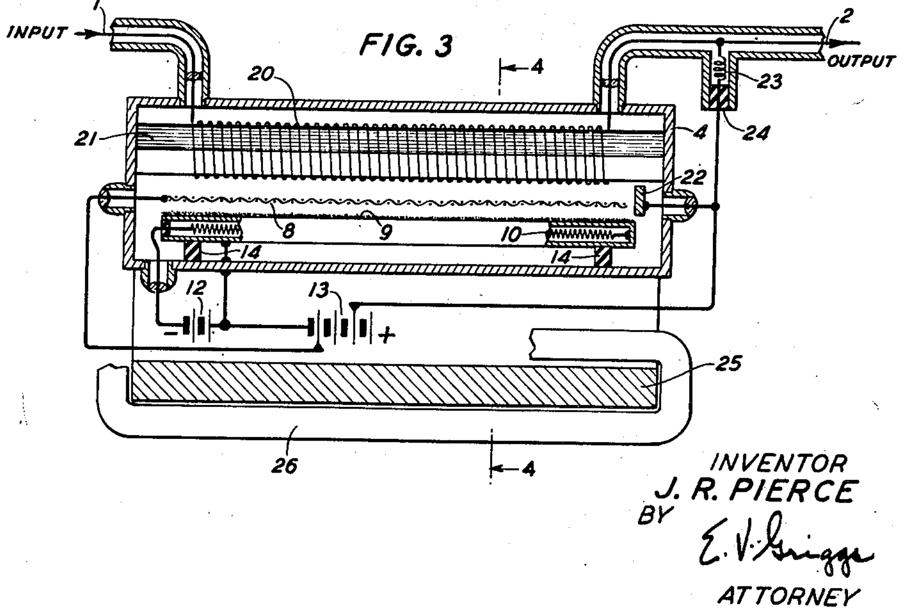
Figs. 3 and 4 illustrate an embodiment in which the length of transmission line included in the amplifier comprises an elongated helix.
Figure 4:
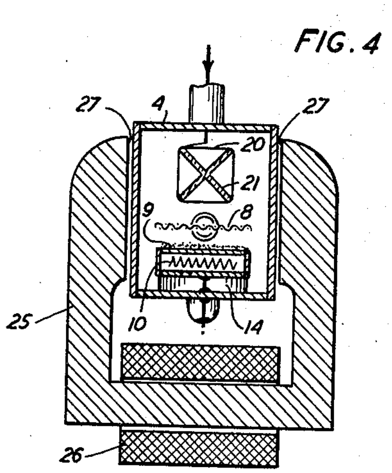

Figs. 3 and 4 show another embodiment of a linear magnetron amplifier. The principal difference between this embodiment and that of Figs. 1 and 2 is the use of a helical coil rather than a series of coupled resonators to provide the wave transmission circuit between the input and output terminals. This circuit too reduces the wave velocity so that the associated electric field travels at about the speed of the electrons in the interaction space between the coil 20 and the cathode 9. The designations of similar elements have been carried over from Figs. 1 and 2 and it will be observed that the evacuated envelope 4, the cathode 9, grid 8 and the potential sources as well as the input and output coaxial leads are the same as in Figs. 1 and 2.

Fig. 3 is a longitudinal section and Fig. 4 is a section perpendicular thereto as indicated.

The helical conductor 20 is wound on an insulating support 21 which may be of ceramic or other suitable material and connects the input lead 1 to the output lead 2. This coil, in addition to providing the high frequency transmission path, serves also as an anode and is biased positively with respect to the cathode by potential source 13 connected to it through the choke coil 23 and lead 2. The insulating bushing 24 serves as a high frequency bypass capacity to prevent (in conjunction with coil 23) the passage of high frequency energy from lead 2 to the lead connecting it to source 13. The auxiliary anode 22 serves to collect electrons directed to the right at that end of the cathode in the same manner as the projection on block 3 in Fig. 2 previously described. As in the Fig. 2 embodiment the grid 8 is not essential but may be used to control the electron current. A unidirectional magnetic field is maintained between the cathode 9 and the helix 20 perpendicular to the electric field there by means of the electromagnet composed of the core 25 and coil 26. The evacuated envelope 4 is located between the pole faces 27 of the core 25 as shown in Fig. 4. Any other suitable means of providing the magnetic field may be employed.

In operation, electrons emitted from the cathode 9 proceed toward the helix, are deflected to the right in the direction of travel of the wave along the helix by the unidirectional magnetic field, and lose energy to the wave through interaction with its high frequency field.

Figure 6:
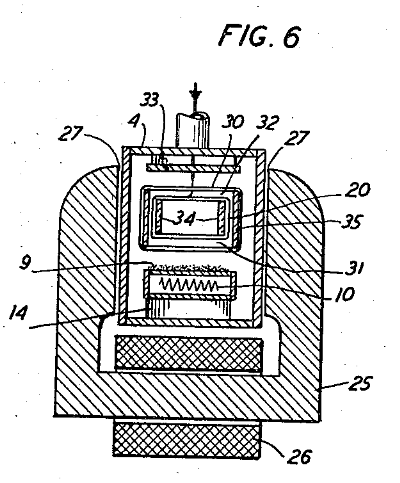
Fig. 5 and 6 illustrate a modification of the embodiment of Figs. 3 and 4 in which electron permeable shielding is placed external to the helix on opposite sides of it and an additional electron collecting or repelling electrode is employed.
Figures 5, 10:
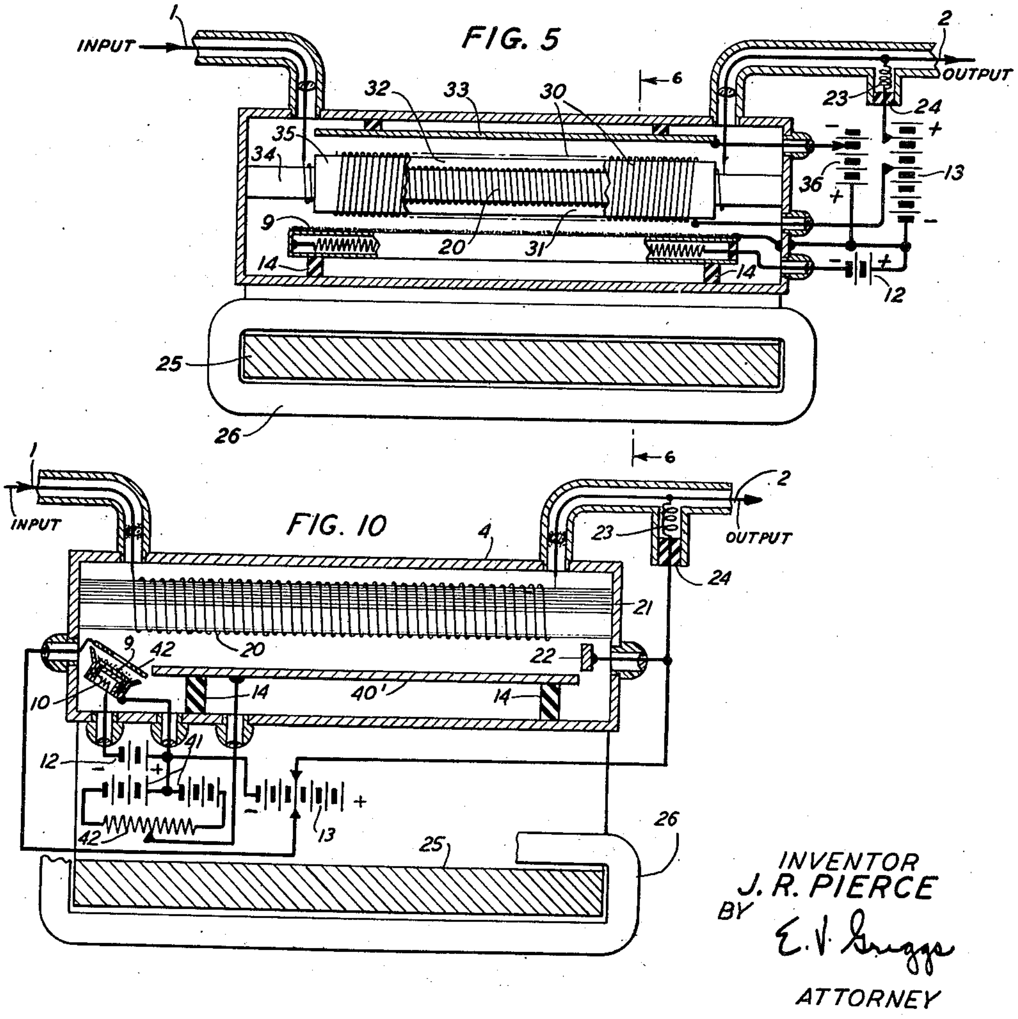
Fig. 10 illustrates an embodiment similar to Fig. 9 except that an electron gun is employed as in Fig. 8.

A modification of the embodiment of Figs. 3 and 4 is illustrated in Figs. 5 and 6, Fig. 5 being a longitudinal section and Fig. 6 being a section perpendicular thereto along the plane 6—6. Designations of similar elements have been carried over from the previous figures.

Modifications incorporated in this embodiment are the provision of shielding 30 around the transmission circuit helix 20 and of a retarding and collecting electrode 33. The structure of the helix 20 is somewhat different from that shown in Figs. 3 and 4 in that the conductor is wound on two strips 34 of a suitable low loss insulating material so that the sides of the coil toward and away from the cathode are open to permit the passage through of electrons. The shield 30 surrounding the helix 20 is shown constructed as a coil wound on two strips of insulating material 35 so that the sides toward and away from the cathode are open to permit the passage of electrons. This shield could be differently constructed, as of screen or perforated material, or it could consist of two separate grids, one above and one below the helix 20. This shield serves to confine the high frequency field of the helix and provide intense fields over short distances where interaction may take place between the field and electrons. Such interaction spaces are at 31 and 32 below and above the helix respectively. The shield 30 is biased positively with respect to the cathode by suitable connection to potential source 13. It may be either positive or negative with respect to the helix.

The plate electrode 33 serves to collect electrons which pass through the shield 30 and the helix 20 with sufficient velocity to reach it and to direct back toward the helix those electrons approaching it at lower velocities. This electrode may be biased either positively or negatively with respect to the cathode by connecting to either potential source 13 or 36. In the figure it is shown connected to source 36 to be negative.

As in Fig. 3 the helix 20 provides the high frequency transmission path between the input lead 1 and the output lead 2. Also the direction of motion of electrons from the cathode is bent in the direction of transmission of the high frequency wave along the helix by the unidirectional magnetic field between the pole-pieces 27 of the electromagnet.

Some electrons leaving the cathode will absorb energy from the high frequency wave through interaction with the field in spaces 31 and 32 and be accelerated; others will lose energy. Thus the electron stream in passing through these spaces is velocity modulated. This velocity-modulated stream may become bunched either through drift action, much as in a reflex klystron, or through the higher speed electrons striking electrode 33 and thus being eliminated. The bunched electron stream returns across the fields in the spaces 32 and 31 and gives up energy to the wave. In addition, the velocity modulation in space 31 on the first transit results in bunching while the electrons pass from 31 to 32 and in giving up energy at 32 and there is additional bunching on the return transit from 32 to 31. All this contributes toward continuously transferring energy from the electrons to the high frequency wave as it passes through the device.

Figure 7:
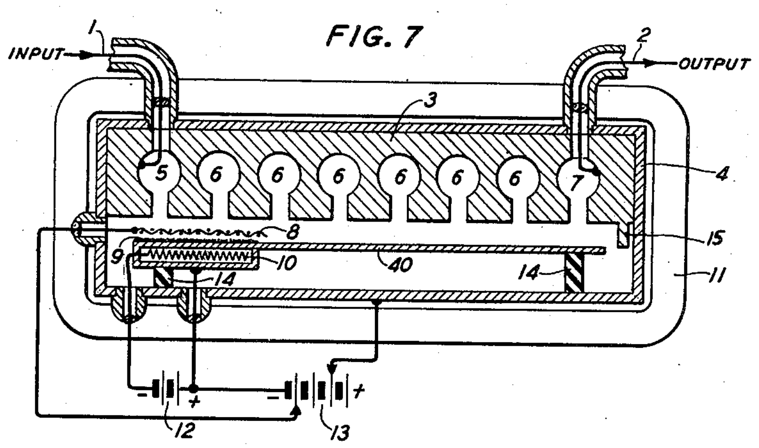
Fig. 7 shows an embodiment similar to Figs. 1 and 2 except that a shorter cathode is used.
Figures 8, 9:
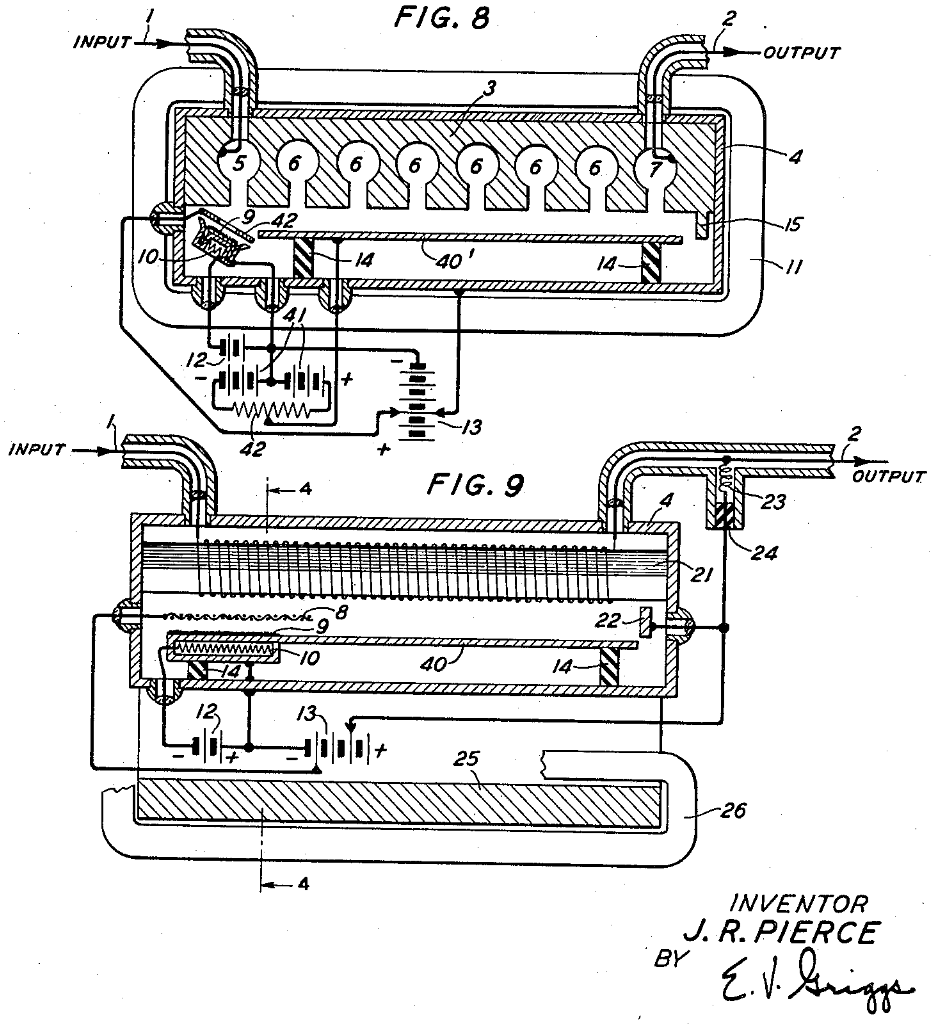
Fig. 8 shows a similar embodiment except that an electron gun is employed.
Fig. 9 illustrates an embodiment similar to Fig. 3 except with a short cathode.

In the three embodiments of Figs. 1 to 6, described above the cathode extends the entire length of the region of interaction between the electrons and the high frequency field. Figs. 7 to 9 illustrate embodiments employing more localized sources of electrons.

Fig. 7 is similar to the showing of Fig. 2 except for the cathode and control grid. The cathode coating 9 extends along only part of the length of the interaction space. The uncoated and unheated portion 40 of the cathode structure extended serves as an electrode to guide the electrons along the interaction space between it and the face of the cavity block 3. The cathode heater 10 and the grid 8 are appropriately shortened to fit the shortened cathode. In general the operation of this embodiment is the same as described in connection with Figs. 1 and 2.

In the embodiment of Fig. 8 the member 40′ is entirely separate from the cathode and an electron gun comprising the cathode coating 9 with its supporting structure, the heater 10 and the accelerating electrode 42, serves as the source of the electron stream. From this gun the electrons are directed into the interaction space and are guided therethrough by the combined action of the electrodes 3 and 40′ and the magnetic field provided by coils 11. The electrode 40′ may be made either positive or negative with respect to the cathode by means of the potential source 41 and the potentiometer 42. The general operation is similar to that of the systems disclosed in Figs. 1, 2 and 7.

The single views of the two embodiments shown in Figs. 7 and 8 are deemed adequate as except for the changed details discussed above the structures are the same as of the embodiment shown in Figs. 1 and 2 and the perspective view Fig. 1 may be considered as generally applicable to all three embodiments.

Fig. 9 illustrates a modification of the Fig. 3 embodiment to use a shortened cathode the same as shown in Fig. 7 and described in connection with that figure. The Fig. 3 embodiment may also be modified to use the electron gun arrangement shown in Fig. 8. Such a modification is shown in Fig. 10. In either of these modifications the general operation is the same as described in connection with Fig. 3. The sectional view Fig. 4 is generally illustrative of the Fig. 9 structure as well as of the Fig. 3 structure, the section being through the cathode in either case.

The figures illustrating the various embodiments of the invention are necessarily neither to scale nor in proportion as they are intended to show as clearly as possible the essential elements of the device and at the same time illustrate the principle of operation. As an example of actual structure the helix of an amplifier according to Fig. 3 designed to operate at a frequency of around 4,000 megacycles was 0.1 inch square and 1.0 inch long with 200 turns of conductor per inch length.

Also it should be understood that within the scope of the invention there may be embodiments and structural details other than those which have been shown and described as illustrative.

What is claimed is:

1. A high frequency device comprising a high frequency input means and a high frequency output means which are connected by a high frequency transmission circuit distributed along a region and capable when energized of producing a high frequency electric field traveling in said region substantially unilaterally in the direction toward said output means at a speed within the range of practical electron speeds, a cathode extending along said region in the direction of travel of said electric field, means producing a flow of electrons from said cathode means into said electric field region, and means producing a unidirectional magnetic field in said electric field region transverse to the direction of travel of the electric field.

2. An electronic high frequency wave amplifier comprising an elongated cathode in a suitable evacuated envelope, a high frequency input means and a high frequency output means which are connected by a high frequency circuit disposed along the length of the cathode and capable of transmitting a high frequency wave to be amplified at a velocity within the range of practical electron velocities, whereby the high frequency electric field of the transmitted wave may travel in the direction of extent of the cathode and in proximity thereto substantially unilaterally toward said output means, a potential source connected to the cathode projecting electrons from the cathode into the region of the said traveling high frequency electric field, and means producing a unidirectional magnetic field in the said region occupied by the high frequency traveling field and the projected electrons transverse to the direction of travel of the high frequency field, whereby the paths of the projected electrons are bent in the direction of travel of the field.

3. An electronic high frequency wave amplifier comprising input and output means which are connected by transmission circuit means for producing a high frequency electric field traveling along a path adjacent to said circuit means in the direction of said output means at a velocity within the range of practical electron velocities, means for projecting electrons into said path of said field in a direction having a component perpendicular to the direction of said path and means for producing a unidirectional magnetic field in said path substantially perpendicular to the direction of the path and to the direction of said component of direction of electron projection.

4. A high frequency electrical wave amplifier comprising input and output means connected by a series of coupled cavity resonators, adjacent resonators being coupled to provide a high frequency transmission circuit through the series from the input end to the output end, apertures in the resonators allowing the high frequency electric fields therein to extend into the external space whereby a high frequency electric field may be produced external to the resonators and traveling substantially unilaterally through the region adjacent to the apertures from the input end of the series of resonators to the output end, a cathode extending along the length of the said region and in proximity to the said apertures, a potential source connected to the said cathode projecting electrons into the said region to interact with the said traveling field, and means producing a unidirectional magnetic field in the said region substantially perpendicular to the direction of travel of the said high frequency electric field and to the direction of projection of electrons from the cathode.

5. A device according to claim 4 including also a foraminate electrode interposed between the said cathode and said apertures in the resonators.

6. A high frequency electrical wave amplifier comprising an elongated helix of conducting material having an input end and an output end and providing a transmission path therealong for the high frequency wave to be amplified, said helix being capable when energized of producing a high frequency electric field traveling along the helix in a region near the turns thereof substantially unilaterally in the direction toward said output end at a speed within the range of practical electron speeds, a cathode extending along the length of the said helix in proximity thereto, a potential source connected to the said cathode projecting electrons into the region near the turns of said helix, and means producing a unidirectional magnetic field in said region substantially perpendicular to the axis of said helix and to the direction of projection of electrons from the cathode.

7. A device according to claim 6 including also an electron permeable electrode interposed between the said cathode and the turns of said helix.

8. A high frequency electrical wave amplifier comprising an elongated helix of conducting material having an input end and an output end and providing a transmission path therealong for the high frequency wave to be amplified, said helix being capable when energized of producing a high frequency electric field traveling along the helix in a region near the turns thereof substantially unilaterally in the direction toward said output end at a speed within the range of practical electron speeds, a cathode extending along the length of the said helix at one side externally to and in proximity thereto, a potential source connected to said cathode projecting electrons in the direction toward said helix, and means producing a unidirectional magnetic field substantially perpendicular to the axis of said helix and to the direction of projection of electrons from the cathode, the said helix being so mounted on its supporting members that the space between turns and through the helix laterally in the direction of projection of electrons from the cathode is unobstructed to the passage of electrons whereby electrons projected from the cathode may pass between the turns of the helix entirely through the helix from the side toward the cathode to the side opposite.

9. A device according to claim 8 comprising also an electron permeable shield of conducting material interposed between the said cathode and the said helix.

10. A device according to claim 8 comprising also an electron permeable shield of conducting material external to the said helix in proximity thereto on the sides toward and away from the said cathode.

11. A device according to claim 8 comprising also a plate electrode disposed along the said helix external thereto on the side away from the said cathode.

12. A device according to claim 10 comprising also a plate electrode disposed along said helix external thereto and to the said shield on the side of the helix away from the cathode, the said shield on that side being between the helix and the plate electrode.

13. An amplifier comprising a high frequency transmission circuit distributed along a region, said circuit having input and output means and being capable of producing a high frequency electric field traveling substantially unilaterally in said region at a speed within the range of practical electron speeds in the direction toward said output means, means producing crossed steady electric and magnetic fields in said region substantially normal to the direction of travel of the said high frequency field and means producing a flow of electrons in said region, the said electrons having components of motion in the direction of travel of said high frequency field.

14. A high frequency electrical wave amplifier comprising a series of coupled cavity resonators having input means connected thereto at one end of the series and output means connected at the other end, adjacent resonators being coupled to provide a high frequency transmission circuit through the series from the input end to the output end, apertures in the resonators allowing the high frequency electric fields therein to extend into the external space whereby a high frequency electric field may be produced external to the resonators and traveling through the region adjacent to the apertures from the input end of the series of resonators to the output end, a cathode extending along a portion of the length of the said region and in proximity to the said apertures, a potential source connected to the said cathode projecting electrons into the said region to interact with the said traveling field and means producing a unidirectional magnetic field in the said region substantially perpendicular to the direction of travel of the said high frequency electric field and to the direction of projection of the said electrons.

15. A device according to claim 14 including also a foraminate electrode interposed between the said cathode and said apertures in the resonators.

16. A high frequency electrical wave amplifier comprising a series of coupled cavity resonators having input means at one end and output means at the other, adjacent resonators being coupled to provide a high frequency transmission circuit through the series from the input end to the output end, apertures in the resonators allowing the high frequency electric fields therein to extend into the external space whereby a high frequency electric field may be produced external to the resonators and traveling substantially unilaterally through the region adjacent to the apertures from the input end of the series of resonators to the output end at a speed within the range of practical electron speeds, an electrode facing the said apertures and extending substantially the length of said region, the said region being between the said electrode and the apertures, an electron gun projecting electrons into the said region at the input end of the series of resonators and means producing a unidirectional magnetic field in the said region substantially perpendicular to the direction of travel of the said high frequency field.

17. A high frequency electrical wave amplifier comprising an elongated helix of conducting material having an input end and an output end and providing a transmission path therealong for the high frequency wave to be amplified, said helix being capable when energized of producing a high frequency electric field traveling along the helix in a region near the turns thereof substantially unilaterally in the direction toward said output end at a speed within the range of practical electron speeds, a cathode extending along a portion of the length of the said helix in proximity thereto, a potential source connected to the said cathode projecting electrons into the region near the turns of the said helix and means producing a unidirectional magnetic field in the said region substantially perpendicular to the axis of said helix and the direction of projection of electrons from the cathode.

18. A device according to claim 17 including also an electron permeable electrode interposed between the said cathode and the turns of said helix.

19. A high frequency electrical wave amplifier comprising an elongated helix of conducting material having an input end and an output end and providing a transmission path therealong for the high frequency wave to be amplified, said helix being capable when energized of producing a high frequency electric field traveling along the helix in a region near the turns thereof substantially unilaterally in the direction toward said output end at a speed within the range of practical electron speeds, an electrode spaced from the helix and extending substantially the length of the helix external to it, an electron gun projecting electrons into the region between the said electrode and the helix at the input end of the helix and means producing a unidirectional magnetic field in the said region perpendicular to the axis of the helix and to the direction between the helix and the said electrode.

20. An electronic high frequency wave amplifier comprising input means and output means connected by transmission circuit means for producing a high frequency electric field traveling substantially unilaterally along a path in the direction toward said output means at a speed within the range of practical electron speeds, means for projecting electrons into said path in a direction having a component perpendicular to said path and means for changing the direction of travel of said electrons in the path toward the direction of travel of said electric field, whereby energy is transferred from the moving electrons to the electric field.

21. An electronic high frequency wave amplifier comprising an evacuated envelope containing input and output means connected by a high frequency transmission circuit extending along a path and capable when energized of producing a high frequency electric field traveling substantially unilaterally along said path in the direction toward said output means at a speed within the range of practical electron speeds, means within said envelope for projecting electrons into said path in a direction having a component perpendicular to the direction of the path and means for producing a unidirectional magnetic field in said path perpendicular to the direction of the path and perpendicular also to said component of direction of electron projection.

22. A high frequency amplifier comprising input means capable of being energized from an external source, output means capable of energizing a load circuit, a high frequency transmission circuit connecting said input and output means extending along a region and being capable, when energized, of producing a high frequency electric field traveling substantially unilaterally in said region in the direction toward said output means at a speed within the range of practical electron speeds, means for producing crossed electric and magnetic fields in said region substantially perpendicular to the direction of travel of said high frequency field and means for producing a flow of electrons in said region to interact with said high frequency field.

23. A high frequency electrical wave translating device comprising input and output means connected by a series of coupled resonators forming a filter type high frequency transmission circuit between said input and output means, said resonators having openings which permit their high frequency electric fields to extend into a region which extends along and adjacent to said openings from the input end of the series of resonators to the output end to produce a high frequency electric field traveling substantially unilaterally in said region in the direction from said input end to said output end of the series of resonators, a cathode, potential means connected to said cathode for projecting electrons into said region in a direction having a component perpendicular to the direction of travel of said electric field to interact with said traveling field and means for producing a unidirectional magnetic field in said region substantially perpendicular to the direction of travel of said traveling field and to said component of direction of projection of said electrons into said region.

24. A high frequency electrical wave amplifier comprising input and output means connected by a high frequency transmission circuit capable of producing a high frequency electric field traveling substantially unilaterally through a region along and adjacent to said circuit in the direction toward said output means at a velocity within the range of practical electron velocities, a cathode, potential means connected to said cathode for projecting electrons into said region to interact with said traveling field, and means for producing a unidirectional magnetic field in said region substantially perpendicular to the direction of travel of said high frequency field and to the direction of projection of electrons from the cathode.

25. A high frequency electrical wave amplifier comprising an elongated helix of conducting material having an input end and an output end and providing a transmission path therealong for the high frequency wave to be amplified, said helix being capable when energized of producing a high frequency electric field traveling along the helix in a region near the turns thereof substantially unilaterally in the direction toward said output end at a speed within the range of practical electron speeds, a cathode, a potential source connected to said cathode projecting electrons into the region near the turns of the said helix, and means producing a unidirectional magnetic field in the said region substantially perpendicular to the axis of said helix and to the direction of projection of electrons from the cathode.

26. A high frequency wave amplifier comprising a nonresonant electrical wave transmission line having an input end for the introduction of the wave to be amplified and an output end for the delivery of the amplified wave, said transmission circuit being in the form of a delay circuit including means for reducing the velocity of wave propagation along the line to a value within the range of practical electron velocities and being capable of producing a high frequency electric field traveling substantially unilaterally along a region adjacent to the line in the direction toward said output end at said reduced wave velocity, means for producing a unidirectional magnetic field in said region of traveling high frequency field substantially perpendicular to the direction of travel of the high frequency field, and cathode means for projecting electrons into said region of the traveling high frequency field with a component of direction perpendicular to the direction of travel of the high frequency field and to the direction of said magnetic field.

27. A traveling wave amplifier comprising an anode structure and a source of electrons, said anode structure comprising a continuous signal wave transmission network having input and output means connected thereto substantially spaced along said network, means for urging electrons from said source along paths adjacent said network at velocities whereat substantial interaction occurs between signal waves in said network and said electrons at the frequency of the signal waves coupled into said network by said input means and out of said network by said output means, and means for applying a magnetic field transverse to the direction of motion of said electrons.

28. An amplifier according to claim 3 in which said transmission circuit means comprises a conductor elongated in the direction of said path and having a multiplicity of slots spaced apart therealong and extending at right angles to the length thereof.

29. An amplifier according to claim 3 in which said electron projecting means comprises an elongated electron emissive cathode located adjacent to said path and extending in the direction thereof.

30. An amplifier according to claim 3 in which the said transmission circuit means is extended substantially rectilinearly along said path.

31. An amplifier for microwave energy comprising: an evacuated envelope; a helical waveguide, the turns of which are spaced with respect to each other, mounted in said envelope; a source of electrons mounted in said envelope exteriorly of and in spaced relationship to said waveguide; a control electrode interposed between said electron-source and said waveguide; means for establishing a magnetic field in the space between said electron-source and said waveguide; said magnetic field having its major component in a direction transverse to the path between said electron-source and said waveguide; and microwave input and output means coupled to said waveguide at predetermined points along the length thereof.

32. A microwave amplifying device comprising, an electron-discharge device having a cathode and anode in substantially extended parallel spaced relation, said cathode having substantially constant electron emission properties along its surface thus presented to said anode, said anode having input and output means attached thereto, whereby when microwave energy is fed into said input, said energy is propagated along the space between said anode and cathode to said output means, magnetic means adjacent said cathode and anode impressing a magnetic field in the space between said cathode and anode for imparting velocity to the electrons in the same direction as, and substantially parallel with, said microwave propagation; and means integral with said anode, said means consisting of a plurality of slots, reducing the phase velocity of said microwave propagation to less than said electron velocity.

33. A traveling wave amplifier comprising an anode structure and a source of electrons, said anode structure comprising a continuous non-reentrant signal wave transmission structure having input and output means connected thereto substantially spaced along said network, and means for urging electrons from said source along paths adjacent said structure in a direction substantially parallel to the direction of transmission of waves along said structure and at velocities whereat substantial interaction occurs between signal waves in said structure and said electrons comprising means for applying a magnetic field substantially transverse to the direction of motion of said electrons.

34. A high frequency electrical wave device comprising a high frequency transmission line forming a circuit for a unilaterally traveling electromagnetic wave which produces an electric field having a component traveling substantially unilaterally along said circuit, means adjacent the end of said circuit farthest along in the direction of travel of the traveling wave for abstracting the traveling wave, means producing crossed electric and magnetic fields in the path of said electromagnetic wave substantially normal to its direction of travel, and means producing a flow of electrons past the circuit with a velocity therepast substantially equal to that of said field component for interaction with the traveling wave.

35. An amplifier for microwave energy comprising: an evacuated envelope; a source of electrons mounted in said envelope; a helical wave guide, the turns of which are spaced with respect to each other, mounted in said envelope, in spaced relationship to said electron source; the turns of said helical wave guide having nonarcuate portions facing said electron source and lying in a plane parallel to a plane including the longitudinal axis of said electron source; a control electrode interposed between said electron source and said wave guide; means for establishing a magnetic field transverse to the path between said electron source and said wave guide; and microwave input and output means coupled to said wave guide at predetermined points along the length thereof.

36. An amplifier for microwave energy comprising: an evacuated envelope; a source of electrons mounted in said envelope; a helical wave guide, the turns of which are spaced with respect to each other, mounted in said envelope, in spaced relationship to said electron source;

the turns of said helical wave guide having non-arcuate portions facing said electron source; a control electrode interposed between said electron source and said wave guide; means for establishing a magnetic field transverse to the path between said electron source and said wave guide; and microwave input and ouput means coupled to said wave guide at predetermined points along the length thereof.

37. An amplifier for microwave energy comprising: an evacuated envelope; a source of electrons mounted in said envelope; a helical wave guide, the turns of which are spaced with respect to each other, mounted in said envelope, in spaced relationship to said electron source; the turns of said helical wave guide having nonarcuate portions facing said electron source; means for establishing a magnetic field transverse to the path between said electron source and said wave guide; and microwave input and output means coupled to said wave guide at predetermined points along the length thereof.

38. A high frequency electrical wave device comprising; an evacuated envelope; a source of electrons mounted in said envelope; a helical wave guide, the turns of which are spaced with respect to each other, mounted in said envelope in spaced relationship to said electron source; the turns of said helical wave guide having nonarcuate portions facing said electron source and defining a surface substantially parallel to the emitting surface of said electron source and uniformly spaced therefrom; means for establishing a magnetic field transverse to the path between said electron source and said wave guide; and microwave input and output means coupled to said wave guide at predetermined points along the length thereof.

39. A high frequency electrical wave device comprising a high frequency transmission circuit distributed along a region, said circuit having means at one end for launching wave energy in the circuit for travel therealong to the other end and means at said other end for abstracting wave energy from the circuit, said circuit being capable of producing a high frequency electric field having a component traveling substantially unilaterally in said region at a speed within the range of practical electron speeds, means producing crossed steady electric and magnetic fields in said region substantially normal to the direction of travel of said high frequency field, and means producing a flow of electrons in said region, said electrons having a component of motion parallel to the direction of said high frequency field.

40. A high frequency electrical wave device comprising a high frequency transmission line forming a circuit for a traveling electromagnetic wave which produces an electric field component having a phase velocity slower than the velocity of light, a coupling connection at the end of the circuit farthest along in the direction of travel of the wave for coupling to a load, means producing crossed electric and magnetic fields in the path of said electromagnetic wave each substantially normal to the direction of travel, and means for producing a flow of electrons past the circuit with a velocity therepast substantially equal to the phase velocity of said field component for interaction with the wave.

References Cited in the file of this patent

UNITED STATES PATENTS

| | | |
|---|---|---|
| 2,064,469 | Haeff | Dec. 15, 1936 |
| 2,122,538 | Potter | July 5, 1938 |
| 2,241,976 | Blewett et al. | May 13, 1941 |
| 2,289,756 | Clavier et al. | July 14, 1942 |
| 2,300,052 | Lindenblad | Oct. 27, 1942 |
| 2,367,295 | Llewellyn | Jan. 16, 1945 |
| 2,409,992 | Strobel | Oct. 22, 1946 |
| 2,428,612 | Blewett | Oct. 7, 1947 |
| 2,439,401 | Smith | April 13, 1948 |
| 2,509,419 | Brown | May 30, 1950 |
| 2,620,458 | Spencer | Dec. 2, 1952 |